US006754614B1

(12) United States Patent
Barton et al.

(10) Patent No.: US 6,754,614 B1
(45) Date of Patent: Jun. 22, 2004

(54) LINEARIZED STATIC PANORAMIC OPTICAL MIRROR

(75) Inventors: George G. Barton, Harkers Island, NC (US); Jeffrey A. Beckstead, Sand Lake, NY (US)

(73) Assignee: InterScience, Inc., Troy, NY (US)

(*) Notice: Subject to any disclaimer, the term of this patent is extended or adjusted under 35 U.S.C. 154(b) by 0 days.

(21) Appl. No.: 09/511,712

(22) Filed: Feb. 23, 2000

Related U.S. Application Data

(60) Provisional application No. 60/121,377, filed on Feb. 25, 1999.

(51) Int. Cl.[7] ............................................. G06G 17/10
(52) U.S. Cl. .................. 703/2; 703/6; 703/7; 359/725; 359/201; 348/36
(58) Field of Search ...................... 703/2, 7; 359/725; 359/201; 348/36

(56) References Cited

U.S. PATENT DOCUMENTS

| | | | |
|---|---|---|---|
| 4,395,093 A | | 7/1983 | Rosendahl et al. |
| 4,429,957 A | | 2/1984 | King |
| 4,484,801 A | | 11/1984 | Cox |
| 5,473,474 A | | 12/1995 | Powell |
| 5,482,568 A | * | 1/1996 | Hockaday |
| 5,631,778 A | | 5/1997 | Powell |
| 5,760,826 A | | 6/1998 | Nayar |
| 5,790,181 A | * | 8/1998 | Chahl et al. .................. 348/36 |
| 5,790,182 A | | 8/1998 | St. Hilaire |
| 5,835,252 A | * | 11/1998 | Meier et al. ................. 359/201 |
| 5,920,376 A | | 7/1999 | Bruckstein et al. |
| 6,003,998 A | | 12/1999 | St. Hilaire |
| 6,028,719 A | * | 2/2000 | Beckstead et al. .......... 359/725 |
| 6,175,454 B1 | * | 1/2001 | Hoogland et al. .......... 359/725 |
| 6,222,683 B1 | | 4/2001 | Hoogland et al. |
| 6,373,642 B1 | | 4/2002 | Wallerstein et al. |
| 6,392,687 B1 | * | 5/2002 | Driscoll, Jr. et al. .......... 348/36 |
| 6,426,774 B1 | * | 7/2002 | Driscoll, Jr. et al. |

OTHER PUBLICATIONS

"Omniview Cameras with Curved Surface Mirrors", A. Burckstein, Bell Labs Technical Memo, May 28, 1996.*
"Analysis and Design of Panoramic Stereo Vision Using Equi-Angular Pixel Cameras", M. Ollis, Carnegie Mellon University, 1999.*
"Omnidirectional Vision: Theory and Algorithms", K. Daniilidis, IEEE, 2000.*
"Panoramic Cameras for 3D Computation", T. Svoboda, Czech Pattern Recognition Workshop, Feb. 2000.*
"Stereo with Mirrors", S. Nene, Sixth International Conference on Computer Vision, Jan. 1998.*
"Omnidirectional Vision", S. Nayar, 1997 International Symposium on Robotics Research, IEEE 1997.*
"Catadioptric Camera Calibration", C. Geyer, University of Pennsylvania, NSF CDS–97–03220, 1999.*
Wong, Erwin. Recreation of Three–Dimensional Objects in a Real–Time Simulated Environment by Means of a Panoramic Single lens Stereoscopic Image Capturing Device, SPIE vol. 3598, 2000, pp. 244–251.
Barton, G.; Feldman, S.; Beckstead, J. & Nordhauser, S. A versatile 360 degree panoramic optical system for autonomous robots, SPIE vol. 3525, Nov. 1998, pp. 106–116.
Feldman, S. & Barton, G. Security with the 360degree Television–Intrusion Detection Surveillance System, SPIE vol. 2934, 1997, pp. 166–177.
Matthys, D.R.; Gilbert, J.A. & Puliparambil, J. Endoscopic inpsection using a panoramic annular lens, SPIE vol. 1554B, 1991, pp. 736–742.

* cited by examiner

*Primary Examiner*—Kevin J. Teska
*Assistant Examiner*—Fred Ferris
(74) *Attorney, Agent, or Firm*—Jay R. Yablon; Michelle D. Simkulet

(57) ABSTRACT

An improved conical panoramic mirror element design is disclosed such that the panoramic vertical field of view is not fixed and the image covers at least 90% of the toroidal image pixels of an imaging device. The data required to prescribe the panoramic conical element includes the position of the detector device, the most negative vertical scene angle, the most positive vertical scene angle, the panoramic cone's base diameter, the cone's apex to base ratio. These are utilized according to a mathematical prescription that optimizes the mirror element's design.

27 Claims, 3 Drawing Sheets

LINEARIZED STATIC PANORAMIC OPTICAL MIRROR

CROSS-REFERENCE TO RELATED APPLICATION

This application claims the benefit of U.S. Provisional Application No. 60,121,377, filed Feb. 25, 1999.

FIELD OF THE INVENTION

This invention relates to the field of panoramic conical mirrors, and particularly to the design and production of panoramic convex conical mirrors for statically viewing any prescribed vertical field of view.

BACKGROUND OF THE INVENTION

An orthographic mirror is a mirror in which all incoming rays are reflected normal to the imaging plane. Existing designs of orthographic mirrors, such as that described by Nayar in U.S. Pat. No. 5,760,826, utilize the standard equation of a parabola limiting the linearity of the images scene to at best 93%. In addition, this approach is also limited to a constant field of view of 90°, ranging from 0° which is the z=0 plane, to 90° which is typically the position of the imaging system above or below the panoramic mirrored cone element. This arrangement produces a panoramic image in which about 25% of the image is unusable since it falls outside this 90° field of view.

Improvements to this design include incorporating a shifted parabola to define the mirrored surface and allowing the field of view to be adjusted based on specific needs of the application the mirror is designed for. Adjustments to the defined field of view can be accomplished by adjusting the vertical incident angles or by adjusting the radial positions corresponding to the angle limits. These adjustments do result in a linearity higher than that achieved by the pure parabola, but there is still room for improvement.

Commonly-invented, commonly-assigned U.S. Pat. No. 6,028,719, issued Feb. 22, 2000, describes use of a panoramic mirrored cone element such as, but not limited to mirrored element of the present disclosure, in an imaging; apparatus that achieves both 360 degree peripheral and forward viewing in a single plane.

OBJECTS OF THE INVENTION

Therefore, it is desirable to provide an improved orthographic mirrored element design.

It is also desirable to provide an improved panoramic conical mirrored element design for statically viewing any prescribed vertical field of view with a scene vertical angle to the image's radial position that achieves linearity greater than 99%.

It is also desirable to provide a means for panoramic imaging of both positive and negative viewing angles, and generally increasing the overall field of view.

SUMMARY OF THE INVENTION

Disclosed herein is an improvement in the design of orthographic panoramic mirrored optical elements. By designing a panoramic mirrored cone element as herein disclosed, a linearity greater than 99% can be achieved. The present invention is based on the ability to iteratively improve on the basic parabolic design by making modifications that approach spherical and/or elliptical designs. Testing the linearity of the panoramic imaging element's design is a major part of the iterative process since each element is designed based on application-specific parameters. The improved design allows for the extension of the vertical filed of view to span the range of +70° to −45° while retaining high linearity greater than 99%.

BRIEF DESCRIPTION OF THE DRAWINGS

The features of the invention believed to be novel are set forth in the associated claims. The invention, however, together with further objects and advantages thereof, may best be understood by reference to the following description taken in conjunction with the accompanying drawings in which:

DETAILED DESCRIPTION

Figure 1:
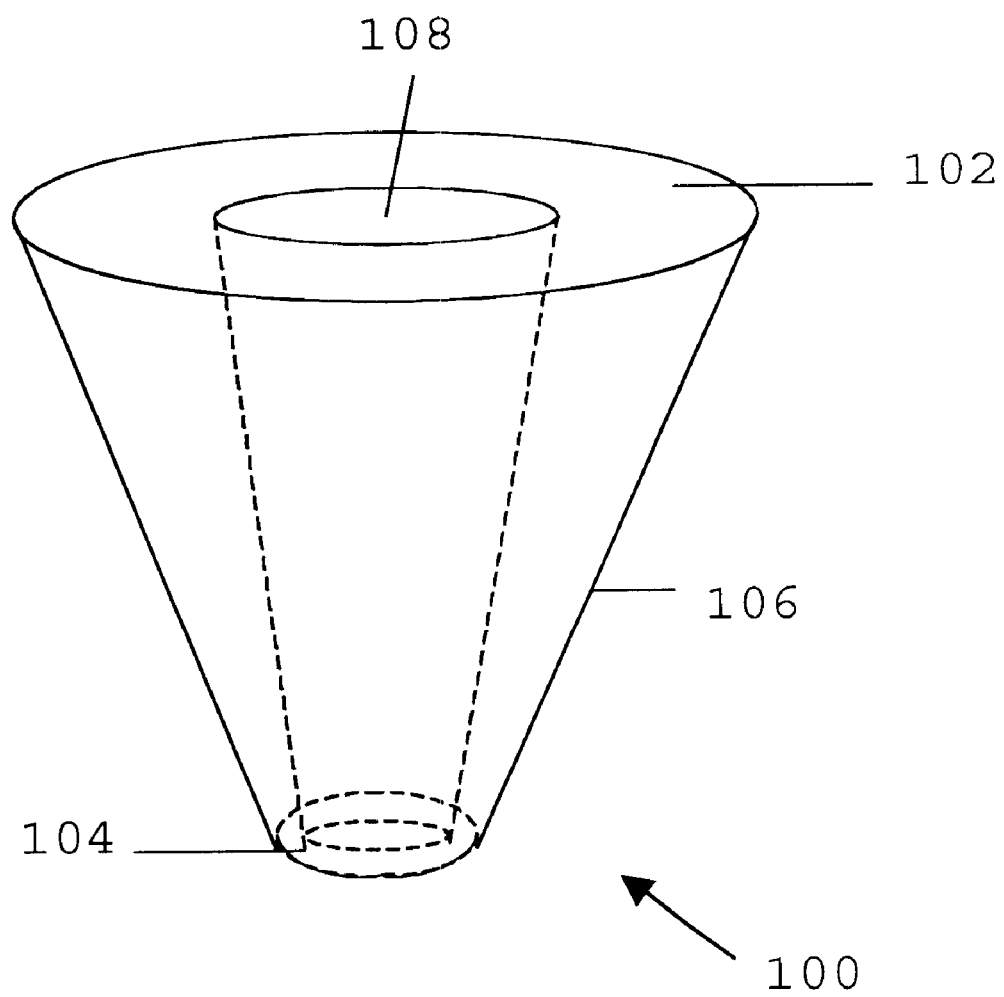
FIG. 1 is a three-dimensional view of the conical mirrored element for panoramic imaging.
Figure 2:
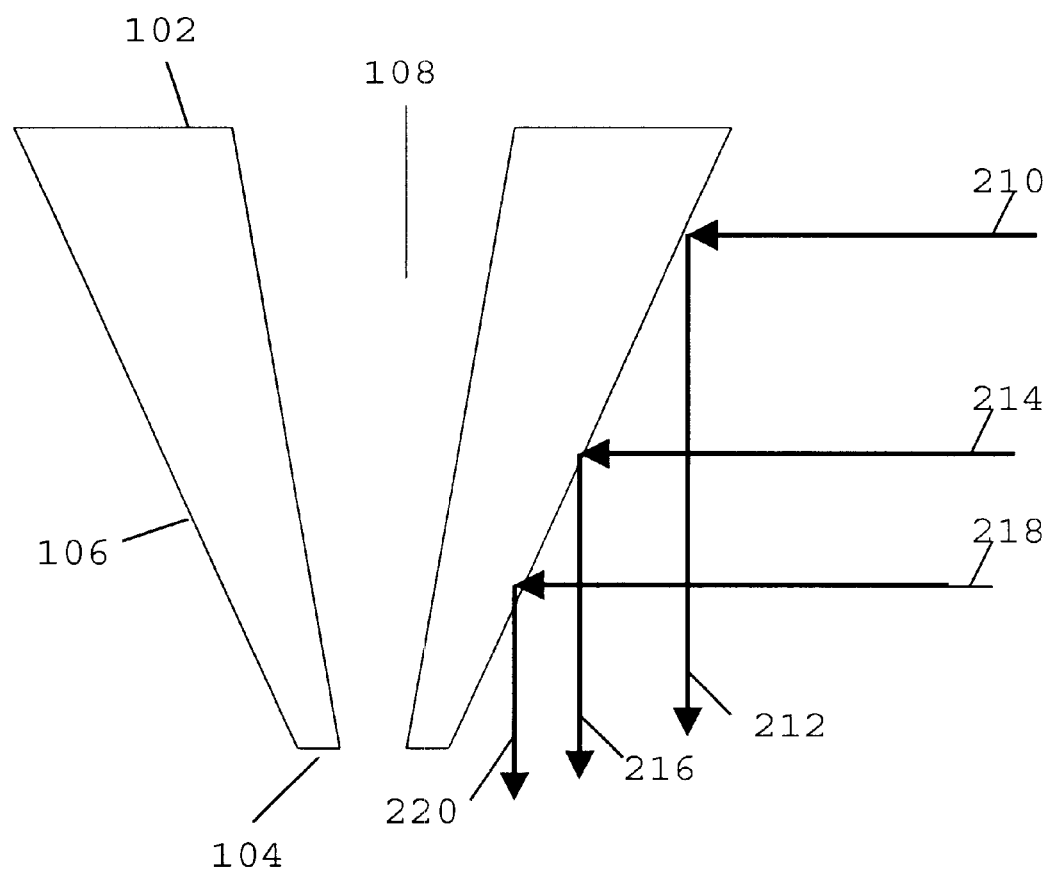
FIG. 2 is a cross-sectional view of a sample conical mirrored element designed according to an embodiment of the invention, showing sample reflective rays for the production of a panoramic image.

The present invention is an improved orthographic mirror design for the production of panoramic images with high linearity, relatively minimal distortion, and expanded vertical field of view. The panoramic conical mirrored element design is specified for statically viewing any prescribed vertical field of view with a scene vertical angle to the image's radial position linear to greater than 99%. A representative panoramic reflective element 100 is shown in FIGS. 1 and 2. In FIG. 1, the basic components of the panoramic element are shown including a base 102, an apex 104, an arc surface 106, and an optional central cylinder 108 running longitudinally therethrough, as shown. Central cylinder 108 is used to capture the forward view field when it is desired to combine both a 360 degree and a forward view field into a single unit, as disclosed in aforementioned U.S. Pat. No. 6,028,719. Otherwise, central cylinder 108 is unnecessary and can be filled with a solid material.

As shown in the cross-sectional view of FIG. 2, the panoramic reflective element is so configured as to generate orthographic image rays with radial positions as a linear function of the object's elevation in the vertical field of view. This detail is demonstrated by input rays 210, 214, and 218. FIG. 2 shows the orthographic reflection of these rays as samples 212, 216, and 220 of reflected rays, which ultimately define a toroidal image upon any plane surface placed normal thereto (typically this toroidal image impinges onto some form of detector). As shown in FIG. 2, the arc surface 106 needs to be designed so that these reflected rays (e.g., 212, 216, and 220) demonstrate high linearity by remaining normal to the image plane regardless of the changes in the arc surface 106 as it follows the prescribed profile from the base 102 to the apex 104. That is a primary purpose of the prescription following.

Given the various parameters of the image's field of view, size, and base to apex ratio, a spherical or parabolic profile and constants can be readily derived. Panoramic element 100 can best be described as a convex aspherical conical element with the cone's apex truncated so as to generate the center of the toroidal image as a function of the cone's apex radius and the periphery of the toroidal image as a function of the cone's base radius.

The mathematical prescription to design panoramic mirrored cone element 100 is represented in the flow chart of FIG. 3 and described in detail below. This flow chart, in a preferred embodiment, is employed by calculating means such as, but not limited to, a computerized device capable of performing the associated mathematical calculations described below. The results of these calculations are used in the design, fabrication and production of panoramic mirrored cone element 100, particularly the arc surface 106 thereof.

Initially, as represented by input box 322, the necessary input parameters are supplied regarding the application-specific design. These input parameters comprise the position of the detector device in the proposed application, the most negative vertical scene angle, the most positive vertical scene angle, the panoramic cone's base 102 diameter, and the panoramic cone's apex 104 diameter (hence also the apex 104 to base 102 aspect ratio Rc).

Next, a parabolic profile, as designated by processing box 324, is determined using the following mathematical prescription. The ultimate goal of this prescription is to determine the tangent to the arc surface's (106) optical axis for the given vertical field of view's most positive and most negative limits represented by Ø1 and Ø2, respectively. The parabolic profile is determined by the following steps, with θ1=45−Ø1/2 and θ2=45−Ø2/2.

First approximation: Kp=Db/2, where Db is the base 102 diameter, hence Kp is the base 102 radius.

1. Solve for y1, x1: y1=Kp/Tan$^2$(θ1)
   x1=2(Kp*y1)$^{1/2}$
2. Solve for y2, x2: y2=Kp/Tan$^2$(θ2)
   x2=2(Kp*y2)$^{1/2}$ For the cone to have the prescribed base diameter and aspect ratio Rc, a factor dX must be determined to correct Kp. Thus:

3. Solve for dX (correction factor for Kp)
   dX=(Rc*(x1−x2))/(Rc−1), (or Rc=(x2+dX)/(x1+dX))

Second approximation: Kp=(Db/2)$^2$/(X2−dX), using the correction factor dX. This corrected, calculated value of Kp can now be plugged into the three sets of equations above and they are recalculated to produce the following factors:

KpX=dX (recalculated with new value of Kp)
KpY=y1 (recalculated with new value of Kp)
Ym=y2−y1 (Ym is the height of the cone)

Once all required factors are determined, two data files are generated. One data file contains all of the axial (angular) positions with their radial values, and the other data file contains all y and x data along with the tangent to the optical axis and the value of Ø (field of view angle) for each value of y. Then accordingly, the following equations are solved as representative of the parabolic profile for x, Tan (θ)=f(y).

$$X=2(Kp*(KpY+y))^{1/2}-KpX$$

$$\text{Tan }(\theta)=(Kp/(KpY+y1))^{1/2}$$

$$\emptyset=90-2*\theta$$

Figure 3:
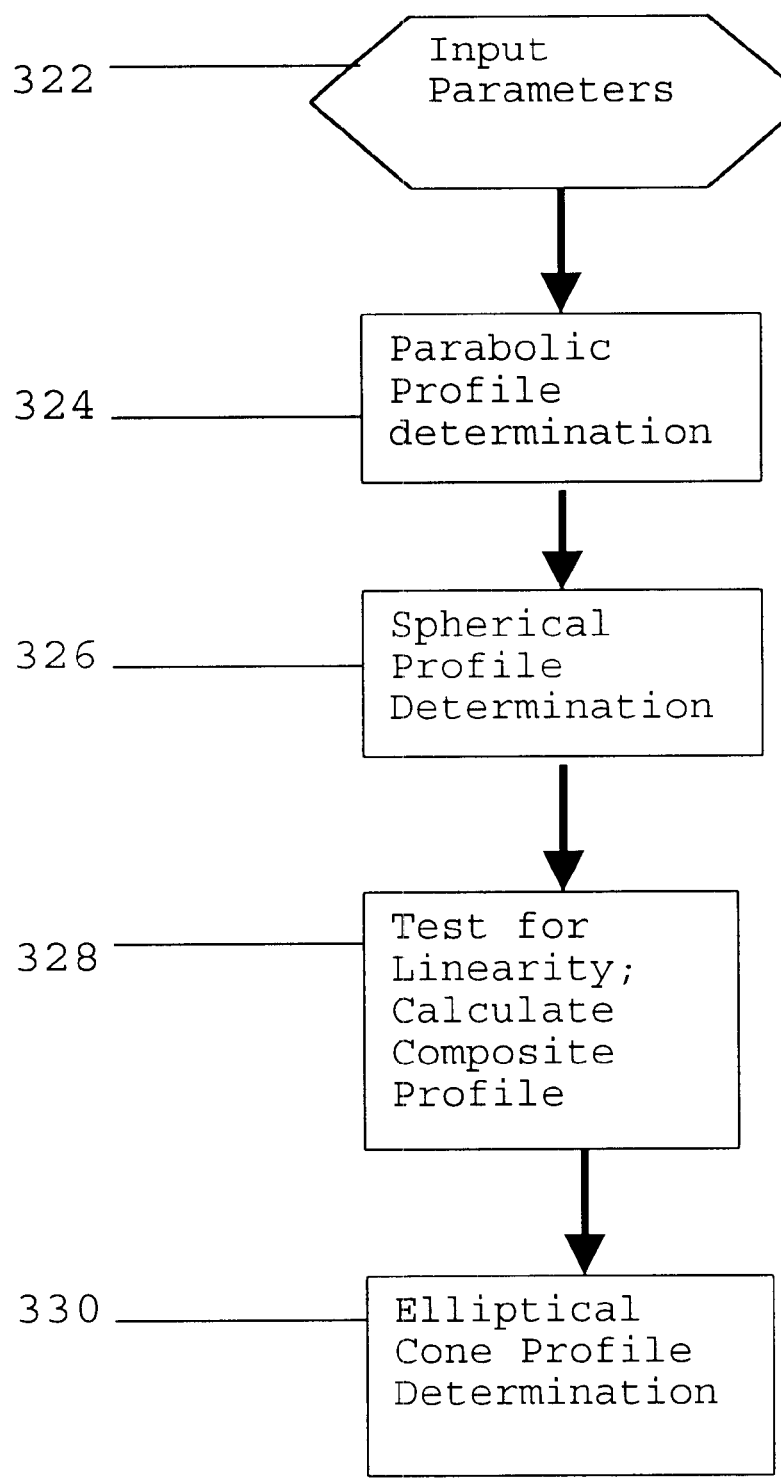
FIG. 3 is a flow chart showing the mathematical determination of the conical mirrored element.

Next, the spherical profile is based on the derivation of the parameters in the parabolic profile as designated by decision box 326 in FIG. 3. The parameters needed to determine the spherical profile are y1, y2, x1, and x2 from the parabolic profile, the height of the cone dy=y2−y1, the width of the face arc dx=x2−x1, and the tangents to the surface which are θ2 at y2 and θ1 at y1. Using these parameters, the following calculations are made to determine spherical constants (Kc, KcY, KcX):

1. length of the chord to the face arc:
   RO=(dy$^2$+dX$^2$)$^{1/2}$
2. spherical radius: Kc=RO*Sin((θ2−θ1)/2)/2
3. constants: KcY=Kc*Sin(θ1)
   KcX=Kc*Cos(θ1)

These parameters are then used to solve for the radial displacement (X) and the tangent to the surface (T) as a function of the axial displacement from the cone's apex. The following equations are used and thus are representative of the spherical profile.

$$X=((Kc^2-(KcY-y)^2)-KcX)^{1/2}$$

$$T=(KcY-y)/((Kc^2-KcY)^2)^{1/2}$$

In an orthographic imaging ray configuration, the radial position of each image ray is directly related to the vertical angle of the objects within the vertical field of view (x (image ray)=f (Ø (object))). If the image ray's radial position x (image ray) is exactly equal to the object's vertical view angle Ø (object), that is, if x (image ray)=Ø (object), then the linearity is 100%, which is optimal.

The parabolic and spherical profiles are then be used to test the parameters for linearity according to the following prescription which is represented by decision box 328 in FIG. 3. The following parameters are utilized:

Ø2=most positive view angle
Ø1=most negative view angle
Rc=apex to base ratio
PxR=number of pixels per radius in detector
PxA=PxR/Rc=number of radial pixels subtended by the cone's blanked apex (the "hole" in the toriodal projection)
PxR−PxA=number of active pixels The parameters utilized and data files produced in the determination of the parabolic and spherical profiles above are utilized to make the following calculations:

1. radial displacement per pixel:
   Dr=(x2−x1)/(PxR−PxA)
2. Ø angle displacement per pixel:
   DØ=(Ø1−Ø2)/(PxR−PxA)
3. Pixel error: start with dPx=0. For n=1 to number of records in the data file, N, calculate:
   Dpx=(Øn−Ø1)/DØ−(xn−x1)/Dr
   If abs (Dpx)>a prior Dpx, store the new Dpx
4. Linearity=1−Dpx/(PxR−PxA)

It is noted that spherical profile orthographic mirrors have a positive Dpx, while parabolic profile mirrors have a negative Dpx three to four times greater in magnitude than the Dpx of spherical profile mirrors.

This data is used to determine the proportionality constants, Js for the spherical profile and Jp for the parabolic profile. In the following Dpp=Parabolic profile Dpx and Dps=Spherical profile Dpx.

$$Js=Dpp/(Dpp+Dps)$$

$$Jp=1-Js$$

Using these proportionality constants, the profile of a composite cone, that lies somewhere between a parabolic profile and a spherical profile is represented by:

$$X=Jp*(2*(Kp*(KpY+Y1))^{1/2}-KpX+Js*(Kc^2-(KcY-Y1)^2)^{1/2}-KcX)$$

$$T=Jp*(Kp/(KpY+Y1))^{1/2}+Js((KcY-Y1)/(Kc^2-(KcY-Y1)^2)^{1/2})$$

This composite cone lies somewhere between the limits established by the parabolic profile (eccentricity e=1) and the spherical profile (eccentricity e=0), which indicates that it may have an elliptical profile. Therefore, all of the above determinations are used to determine the elliptical equations as represented by decision box 330 in FIG. 3. Someone skilled in the art should be readily able to approximate the value of e (eccentricity) based on the above data, and by iterative procedure, determine the value of e for the least pixel error.

The following parameters are now utilized: $b=a(1-e^2)^{1/2}$ and Ym=Parabolic y2−y1. Initially the elliptical constants (Ke, KeY, KeX) are calculated according to the following prescription:

Initial conditions: $Km=(1-e^2)^{1/2}$ (that is, a=1 and Km=b) and Ke=an initial value which, prior to the first iteration of box 330 is user-defined and application-dependent. An initial value for Ke in the neighborhood of 100 is often suitable for many applications.

1. $y1=Ke*Tan(\theta1)/(Km^2+Tan^2(\theta1))^{1/2}$
2. $y2=Ke*Tan(\theta2)/(Km^2+Tan^2(\theta2))^{1/2}$
3. $Ke=Ke*Ym/(y1-y2)$
4. Recalculate equations 1, 2, 3
5. $x1=Km*(Ke^2-y1^2)^{1/2}$
6. $x2=Km*(Ke^2-y2^2)^{1/2}$
7. $KeX=(x2-(Rc*x1))/(1-Rc)$
8. $Ke=Ke*Db/2/(x2-Kex)$
9. Recalculate equations 1,2,5,6,7
10. KeY=y1
11. Ya=KeY−y (y being a controlling variable)

These parameters are utilized in determining the elliptical profile with an observed linearity of greater than 99.5%. The elliptical profile is represented by the following equations:

$$X=Km*(Ke^2-Ya^2)^{1/2}$$

$$T=Km*y/(Ke^2-Ya^2)^{1/2}$$

This elliptical profile provides an improved panoramic reflective element to be used in an imaging system incorporating a pixelated detector. The improvements lie in the expanded vertical field of view to span the range of +70° to −45°, and the increased linearity of the reflected image. The panoramic mirrored cone element may then be fabricated based on this elliptical profile.

While only certain preferred features of the invention have been illustrated and described, many modifications, changes and substitutions will occur to those skilled in the art. It is, therefore, to be understood that this disclosure and its associated claims are intended to cover all such modifications and changes as fall within the true spirit of the invention.

We claim:

1. A method for designing a fabrication profile for a panoramic mirrored cone element, said cone element comprising a base and an apex, using calculating means for performing mathematical calculations, comprising the steps, starting with a plurality of predetermined input parameters for said cone element, of;

calculating a parabolic profile for said cone element;
calculating a spherical profile for said cone element, based on said parabolic profile;
calculating a composite profile for said cone element, based on said parabolic profile and said spherical profile; and
calculating an elliptical profile for said cone element, based on said composite profile; wherein
said fabrication profile comprises said elliptical profile.

2. The method of claim 1, said predetermined input parameters comprising:

a position of a detector device in a proposed application of said cone element;
a most positive vertical scene angle Ø1;
a most negative vertical scene angle Ø2;
an initial diameter of said base of said cone element;
an initial aspect ratio of said cone element, defined as a ratio of said apex of said cone to said base of said cone.

3. The method of claim 2, said step of calculating said parabolic profile for said cone element further comprising the steps of:

A) for a first approximation:
   1: solving for y1, x1: $y1=Kp/Tan^2(\theta1)$
      $x1=2(Kp*y1)^{1/2}$
   2: solving for y2, x2: $y2=Kp/Tan^2(\theta2)$
      $x2=2(Kp*y2)^{1/2}$,
where $\theta1=45-\emptyset1/2$ and $\theta2=45-\emptyset2/2$, and Kp=Db/2, where Db is a diameter of said base of said cone element, and
   3: determining a correction factor dX for Kp:
      $dX=(Rc*(x1-x2))/(Rc-1)$; where Rc denotes an aspect ratio of said cone element apex to said cone element base;

B) for a second approximation:
   4: setting $Kp=(Db/2)^2/(X2-dX)$,
   recalculating said equations 1, 2, and 3 using said value of Kp determined by said equation 4, and calculating the factors:
      KpX=dX, recalculated with said Kp of equation B)4,
      KpY=y1, recalculated with said Kp of equation B)4,
      Ym=y2−y1, where Ym is a height of said cone element;

C) generating data files containing angular and associated radial positions of all points of said parabolic profile, and y and x coordinates of all points of said parabolic profile and associated tangents to an optical axis and a value of Ø for each value of said y coordinates; and D) using said data files generated in said step C), solving for x, Tan (θ)=f(y), the parabolic profile equations:

$$X=2(Kp*(KpY+y))^{1/2}-KpX$$

$$\text{Tan}(\theta)=(Kp/(KpY+y1))^{1/2}$$

$$\emptyset=90-2*\theta.$$

4. The method of claim 3, said step of calculating said spherical profile for said cone element further comprising the steps of:

E) determining spherical constants Kc, KcY, KcX by calculating:
   1: a length of a chord to a face arc:
      $RO=(dy^2+dx^2)^{1/2}$
   2: a spherical radius: $Kc=RO*Sin((\theta2-\theta1)/2)/2$
   3: spherical constants: $KcY=Kc*Sin(\theta1)$
      $KcX=Kc*Cos(\theta1)$,
where said height of said cone element dy=y2−y1, a width of a face arc dx=x2−x1, and tangents to a surface which are θ2 at y2 and θ1 at y1, using said y1, y2, x1, and x2 generated from said step of calculating said parabolic profile; and F) solving the spherical profile equations:

$$X=((Kc^2-(KcY-y)^2)-KcX)^{1/2}$$

$$T=(KcY-y)/((Kc^2-KcY)^2)^{1/2},$$

where X designates a radial displacement and T designates a tangent to the surface as a function of an axial displacement from said apex of said cone.

5. The method of claim 4, said step of calculating said composite profile for said cone element further comprising the steps of:
   G) using the parameters and data files generated in said steps of calculating said parabolic and spherical profiles, calculating:
      1: Dr=(x2−x1)/(PxR−PxA), radial displacement per pixel,
      2: DØ=(Ø1−Ø2)/(PxR−PxA), Ø angle displacement per pixel,
      3: Dpx=(Øn−Ø1)/DØ−(xn−x1)/Dr, pixel error, for all records in said data files, and if abs (Dpx)>a prior Dpx, storing the larger magnitude Dpx,
      4: 1−Dpx/(PxR−PxA), linearity, where:
         PxR=number of pixels per radius in detector,
         PxA=PxR/Rc=number of radial pixels subtended by said apex of said cone element, and
         PxR−PxA=number of active pixels;
   H) determining proportionality constants Js for said spherical profile and Jp for said parabolic profile, as:
      Js=Dpp/(Dpp+Dps)
      Jp=1−Js,
   where Dpp=Parabolic profile Dpx and Dps=Spherical profile Dpx; and
   I) solving the composite profile equations:

$X=Jp*(2*(Kp*(KpY+Y1))^{1/2}-KpX+Js*(Kc^2-(KcY-Y1)^2)^{1/2}-KcX)$ $T=Jp*(Kp/(KpY+Y1))^{1/2}+Js((KcY-Y1)/(Kc^2-(KcY-Y1)^2)^{1/2})$.

6. The method of claim 5, said step of calculating said elliptical profile for said cone element further comprising the steps of:
   J) approximating an eccentricity e from the data produced by said steps of calculating said parabolic, spherical, and composite profiles for said cone element, and by iterative procedure, determining a value of e for a least pixel error;
   K) calculating elliptical constants Ke, KeY, KeX using parameters b=a(1−e$^2$)$^{1/2}$ and Ym=Parabolic y2−y1, with initial conditions Km=(1−e$^2$)$^{1/2}$ and Ke=an initial, user-defined value, according to:
      1: y1=Ke*Tan(θ1)/(Km$^2$+Tan$^2$(θ1))$^{1/2}$
      2: y2=Ke*Tan(θ2)/(Km$^2$+Tan$^2$(θ2))$^{1/2}$
      3: Ke=Ke*Ym/(y1−y2)
      4: Recalculate equations K) 1, 2, 3
      5: x1=Km*(Ke$^2$−y1$^2$)$^{1/2}$
      6: x2=Km*(Ke$^2$−y2$^2$)$^{1/2}$
      7: KeX=(x2−(Rc*x1))/(1−Rc)
      8: Ke=Ke*Db/2/(x2−Kex)
      9: Recalculate equations K) 1, 2, 5, 6, 7
      10: KeY=y1
      11: Ya=KeY−y, y being a controlling variable; and
   L) solving the elliptical profile equations:

$X=Km*(Ke^2-Ya^2)^{1/2}$ $T=Km*y/(Ke^2-Ya^2)^{1/2}$.

7. The method of claim 1, further comprising the step of fabricating said panoramic mirrored cone element using said fabrication profile.

8. The method of claim 6, further comprising the step of fabricating said panoramic mirrored cone element using said fabrication profile.

9. The method of claim 7, further comprising the step of fabricating a central cylinder running longitudinally through said panoramic mirrored cone element.

10. A panoramic mirrored cone element product, produced by a process for designing a fabrication profile for said cone element, said cone element comprising a base and an apex, said process comprising the steps, starting with a plurality of predetermined input parameters for said cone element, of:
    calculating a parabolic profile for said cone element;
    calculating a spherical profile for said cone element, based on said parabolic profile;
    calculating a composite profile for said cone element, based on said parabolic profile and said spherical profile; and
    calculating an elliptical profile for said cone element, based on said composite profile; wherein
    said fabrication profile comprises said elliptical profile.

11. The product of claim 10, said predetermined input parameters comprising:
    a position of a detector device in a proposed application of said cone element;
    a most positive vertical scene angle Ø1;
    a most negative vertical scene angle Ø2;
    an initial diameter of said base of said cone element;
    an initial aspect ratio of said cone element, defined as a ratio of said apex of said cone to said base of said cone.

12. The product of claim 11, said step of calculating said parabolic profile for said cone element further comprising the steps of:
    A) for a first approximation:
       1: solving for y1, x1: y1=Kp/Tan$^2$(θ1)
          x1=2(Kp*y1)$^{1/2}$
       2: solving for y2, x2: y2=Kp/Tan$^2$(θ2)
          x2=2(Kp*y2)$^{1/2}$,
    where θ1=45−Ø1/2 and θ2=45−Ø2/2, and Kp=Db/2, where Db is a diameter of said base of said cone element, and
       3: determining a correction factor dX for Kp:
          dX=(Rc*(x1−x2))/(Rc−1); where Rc denotes an aspect ratio of said cone element apex to said cone element base;
    B) for a second approximation:
       4: setting Kp=(Db/2)$^2$/(X2−dX),
       recalculating said equations 1, 2, and 3 using said value of Kp determined by said equation 4, and
       calculating the factors:
          KpX=dX, recalculated with said Kp of equation B)4,
          KpY=y1, recalculated with said Kp of equation B)4,
          Ym=y2−y1, where Ym is a height of said cone element;
    C) generating data files containing angular and associated radial positions of all points of said parabolic profile, and y and x coordinates of all points of said parabolic profile and associated tangents to an optical axis and a value of Ø for each value of said y coordinates; and
    D) using said data files generated in said step C), solving for x, Tan (θ)=f(y), the parabolic profile equations:

$X=2(Kp*(KpY+y))^{1/2}-KpX$ $Tan(\theta)=(Kp/(KpY+y1))^{1/2}$ $\emptyset=90-2*\theta$.

13. The product of claim 12, said step of calculating said spherical profile for said cone element further comprising the steps of:

E) determining spherical constants Kc, KcY, KcX by calculating:
1: a length of a chord to a face arc:
$RO=(dy^2+dx^2)^{1/2}$
2: a spherical radius: $Kc=RO*Sin((\theta 2-\theta 1)/2)/2$
3: spherical constants: $KcY=Kc*Sin(\theta 1)$
$KcX=Kc*Cos(\theta 1)$,
where said height of said cone element $dy=y2-y1$, a width of a face arc $dx=x2-x1$, and tangents to a surface which are $\theta 2$ at y2 and $\theta 1$ at y1, using said y1, y2, x1, and x2 generated from said step of calculating said parabolic profile; and F) solving the spherical profile equations:

$X=((Kc^2-(KcY-y)^2)-KcX)^{1/2}$ $T=(KcY-y)/((Kc^2-KcY)^2)^{1/2}$, where X designates a radial displacement and T designates a tangent to the surface as a function of an axial displacement from said apex of said cone.

14. The product of claim 13, said step of calculating said composite profile for said cone element further comprising the steps of:
G) using the parameters and data files generated in said steps of calculating said parabolic and spherical profiles, calculating:
1: $Dr=(x2-x1)/(PxR-PxA)$, radial displacement per pixel,
2: $D\emptyset=(\emptyset 1-\emptyset 2)/(PxR-PxA)$, Ø angle displacement per pixel,
3: $Dpx=(\emptyset n-\emptyset 1)/D\emptyset-(xn-x1)/Dr$, pixel error, for all records in said data files, and if abs (Dpx)>a prior Dpx, storing the larger magnitude Dpx,
4: $1-Dpx/(PxR-PxA)$, linearity, where:
PxR=number of pixels per radius in detector,
PxA=PxR/Rc=number of radial pixels subtended by said apex of said cone element, and
PxR−PxA=number of active pixels;
H) determining proportionality constants Js for said spherical profile and Jp for said parabolic profile, as:
Js=Dpp/(Dpp+Dps)
Jp=1−Js,
where Dpp=Parabolic profile Dpx and Dps=Spherical profile Dpx; and
I) solving the composite profile equations:

$X=Jp*(2*(Kp*(KpY+Y1))^{1/2}-KpX+Js*(Kc^2-(KcY-Y1)^2)^{1/2}-KcX)$ $T=Jp*(Kp/(Kpy+Y1))^{1/2}+Js((KcY-Y1)/(Kc^2-(KcY-Y1)^2)^{1/2})$.

15. The product of claim 14, said step of calculating said elliptical profile for said cone element further comprising the steps of:
J) approximating an eccentricity e from the data produced by said steps of calculating said parabolic, spherical, and composite profiles for said cone element, and by iterative procedure, determining a value of e for a least pixel error;
K) calculating elliptical constants Ke, KeY, KeX using parameters $b=a(1-e^2)^{1/2}$ and Ym=Parabolic y2−y1, with initial conditions $Km=(1-e^2)^{1/2}$ and Ke=an initial, user-defined value, according to:
1: $y1=Ke*Tan(\theta 1)/(Km^2+Tan^2(\theta 1))^{1/2}$
2: $y2=Ke*Tan(\theta 2)/(Km^2+Tan^2(\theta 2))^{1/2}$
3: $Ke=Ke*Ym/(y1-y2)$
4: Recalculate equations K) 1, 2, 3
5: $x1=Km*(Ke^2-y1^2)^{1/2}$
6: $x2=Km*(Ke^2-y2^2)^{1/2}$
7: $KeX=(x2-(Rc*x1))/(1-Rc)$
8: $Ke=Ke*Db/2/(x2-Kex)$
9: Recalculate equations K) 1, 2, 5, 6, 7
10: KeY=y1
11: Ya=KeY−y, y being a controlling variable; and
L) solving the elliptical profile equations:

$X=Km*(Ke^2-Ya^2)^{1/2}$ $T=Km*y/(Ke^2-Ya^2)^{1/2}$.

16. The product of claim 10, said process further comprising the step of fabricating said panoramic mirrored cone element using said fabrication profile.

17. The product of claim 15, said process further comprising the step of fabricating said panoramic mirrored cone element using said fabrication profile.

18. The product of claim 10, further comprising a central cylinder running therethrough.

19. A computerized device used for designing a fabrication profile for a panoramic mirrored cone element, said cone element comprising a base and an apex, said computerized device comprising means, starting with a plurality of predetermined input parameters for said cone element, for:
calculating a parabolic profile for said cone element;
calculating a spherical profile for said cone element, based on said parabolic profile;
calculating a composite profile for said cone element, based on said parabolic profile and said spherical profile; and
calculating an elliptical profile for said cone element, based on said composite profile; wherein
said fabrication profile comprises said elliptical profile.

20. The computerized device of claim 19, said predetermined input parameters comprising:
a position of a detector device in a proposed application of said cone element;
a most positive vertical scene angle $\emptyset 1$;
a most negative vertical scene angle $\emptyset 2$;
an initial diameter of said base of said cone element;
an initial aspect ratio of said cone element, defined as a ratio of said apex of said cone to said base of said cone.

21. The computerized device of claim 20, said means for calculating said parabolic profile for said cone element further comprising means for:
A) for a first approximation:
1: solving for y1, x1: $y1=Kp/Tan^2(\theta 1)$
$x1=2(Kp*y1)^{1/2}$
2: solving for y2, x2: $y2=Kp/Tan^2(\theta 2)$
$x2=2(Kp*y2)^{1/2}$,
where $\theta 1=45-\emptyset 1/2$ and $\theta 2=45-\emptyset 2/2$, and Kp=Db/2, where Db is a diameter of said base of said cone element, and
3: determining a correction factor dX for Kp:
$dX=(Rc*(x1-x2))/(Rc-1)$; where Rc denotes an aspect ratio of said cone element apex to said cone element base;
B) for a second approximation:
4: setting $Kp=(Db/2)^2/(X2-dX)$,
recalculating said equations 1, 2, and 3 using said value of Kp determined by said equation 4, and
calculating the factors:
KpX=dX, recalculated with said Kp of equation B)4,
KpY=y1, recalculated with said Kp of equation B)4,
Ym=y2−y1, where Ym is a height of said cone element;

C) generating data files containing angular and associated radial positions of all points of said parabolic profile, and y and x coordinates of all points of said parabolic profile and associated tangents to an optical axis and a value of Ø for each value of said y coordinates; and D) using said data files generated in said step C), solving for x, Tan (θ)=f(y), the parabolic profile equations:

$$X=2(Kp*(KpY+y))^{1/2}-KpX$$

$$\text{Tan}(\theta)=(Kp/(KpY+y1))^{1/2}$$

$$\emptyset=90-2*\theta.$$

22. The computerized device of claim 21, said means for calculating said spherical profile for said cone element further comprising means for:

E) determining spherical constants Kc, KcY, KcX by calculating:
 1: a length of a chord to a face arc:
  $RO=(dy^2+dx^2)^{1/2}$
 2: a spherical radius: $Kc=RO*\text{Sin}((\theta2-\theta1)/2)/2$
 3: spherical constants: $KcY=Kc*\text{Sin}(\theta1)$
  $KcX=Kc*\text{Cos}(\theta1)$, where said height of said cone element dy=y2−y1, a width of a face arc dx=x2−x1, and tangents to a surface which are θ2 at y2 and θ1 at y1, using said y1, y2, x1, and x2 generated from said means for calculating said parabolic profile; and F) solving the spherical profile equations:

$$X=((Kc^2-(KcY-y)^2)-KcX)^{1/2}$$

$$T=(KcY-y)/((Kc^2-KcY)^2)^{1/2},$$

where X designates a radial displacement and T designates a tangent to the surface as a function of an axial displacement from said apex of said cone.

23. The computerized device of claim 22, said means for calculating said composite profile for said cone element further comprising means for:

G) using the parameters and data files generated in said steps of calculating said parabolic and spherical profiles, calculating:
 1: Dr=(x2−x1)/(PxR−PxA), radial displacement per pixel,
 2: DØ=(Ø1−Ø2)/(PxR−PxA), Ø angle displacement per pixel,
 3: Dpx=(Øn−Ø1)/DØ−(xn−x1)/Dr, pixel error, for all records in said data files, and if abs (Dpx)>a prior Dpx, storing the larger magnitude Dpx,
 4: 1−Dpx/(PxR−PxA), linearity, where:
  PxR=number of pixels per radius in detector,
  PxA=PxR/Rc=number of radial pixels subtended by said apex of said cone element, and
  PxR−PxA=number of active pixels;

H) determining proportionality constants Js for said spherical profile and Jp for said parabolic profile, as:

$$Js=Dpp/(Dpp+Dps)$$

$$Jp=1-Js,$$

where Dpp=Parabolic profile Dpx and Dps=Spherical profile Dpx; and

I) solving the composite profile equations:

$$X=Jp*(2*(Kp*(KpY+Y1))^{1/2}-KpX+Js*(Kc^2-(KcY-Y1)^2)^{1/2}-KcX)$$

$$T=Jp*(Kp/(KpY+Y1))^{1/2}+Js((KcY-Y1)/(Kc^2-(KcY-Y1)^2)^{1/2}).$$

24. The computerized device of claim 23, said means for calculating said elliptical profile for said cone element further comprising means for:

J) approximating an eccentricity e from the data produced by said steps of calculating said parabolic, spherical, and composite profiles for said cone element, and by iterative procedure, determining a value of e for a least pixel error;

K) calculating elliptical constants Ke, KeY, KeX using parameters $b=a(1-e^2)^{1/2}$ and Ym=Parabolic y2−y1, with initial conditions $Km=(1-e^2)^{1/2}$ and Ke=an initial, user-defined value, according to:
 1: $y1=Ke*\text{Tan}(\theta1)/(Km^2+\text{Tan}^2(\theta1))^{1/2}$
 2: $y2=Ke*\text{Tan}(\theta2)/(Km^2+\text{Tan}^2(\theta2))^{1/2}$
 3: $Ke=Ke*Ym/(y1-y2)$
 4: Recalculate equations K) 1, 2, 3
 5: $x1=Km*(Ke^2-y1^2)^{1/2}$
 6: $x2=Km*(Ke^2-y2^2)^{1/2}$
 7: $KeX=(x2-(Rc*x1))/(1-Rc)$
 8: $Ke=Ke*Db/2/(x2-Kex)$
 9: Recalculate equations K) 1, 2, 5, 6, 7
 10: KeY=y1
 11: Ya=KeY−y, y being a controlling variable; and L) solving the elliptical profile equations:

$$X=Km*(Ke^2-Ya^2)^{1/2}$$

$$T=Km*y/(Ke^2-Ya^2)^{1/2}.$$

25. The computerized device of claim 19, further comprising means for fabricating said panoramic mirrored cone element using said fabrication profile.

26. The computerized device of claim 24, further comprising means for fabricating said panoramic mirrored cone element using said fabrication profile.

27. The computerized device of claim 25, further comprising means for fabricating a central cylinder running longitudinally through said panoramic mirrored cone element.

* * * * *